United States Patent

[11] 3,626,391

[72] Inventor Wilhelm Anacker
Yorktown Heights, N.Y.
[21] Appl. No. 744,949
[22] Filed July 15, 1968
[45] Patented Dec. 7, 1971
[73] Assignee International Business Machines Corporation
Armonk, N.Y.

[54] JOSEPHSON TUNNELING MEMORY ARRAY INCLUDING DRIVE DECODERS THEREFOR
14 Claims, 11 Drawing Figs.

[52] U.S. Cl. .......... 340/173.1, 307/238, 307/245
[51] Int. Cl. .......... G11c 11/44, H03k 3/38
[50] Field of Search .......... 340/173.1; 307/238, 245

[56] References Cited
UNITED STATES PATENTS

| | | | |
|---|---|---|---|
| 3,047,744 | 7/1962 | Pankave | 340/173.1 |
| 3,116,427 | 12/1963 | Giaver | 340/173.1 |
| 3,209,160 | 9/1965 | Jeeves | 307/238 |
| 3,281,609 | 10/1966 | Rowell | 307/245 |

*Primary Examiner*—Terrell W. Fears
*Attorney*—Hanifin and Jancin

ABSTRACT: A memory array comprising memory cells having tunneling gates exhibiting Josephson current. Each memory cell is composed of two Josephson devices, each of which is located in a separate leg of the cell. Drive decoders using Josephson devices are also provided for selection of current into drive, bit, and sense lines (also having Josephson devices) associated with the memory cells. The direction of current flow in a memory cell determines its binary state.

INVENTOR
WILHELM ANACKER
BY Harry M Weiss
ATTORNEY

JOSEPHSON TUNNELING MEMORY ARRAY INCLUDING DRIVE DECODERS THEREFOR

THE DISCLOSURE BACKGROUND

1. Field of the Invention

This invention relates generally to memory arrays including decoders therefor, and, more particularly to Josephson tunneling memory arrays using compatible Josephson tunneling drive decoders for selection and direction of current into drive, bit, and sense lines of the selected storage cells of the array.

2. Description of the Prior Art

In a paper entitled "Possible New Effects In Superconductive Tunneling" published in the July 1, 1962 issue of Physics Letters, Pages 251–252, B. D. Josephson made a theoretical prediction that super current could flow between two superconductors that were separated by a thin insulating barrier which provided a super current tunneling junction. U.S. Pat. No. 3,281,609 to John M. Rowell is an application of this Josephson tunneling effect to switching and logic devices. As further background, a patent application, Ser. No. 685,700 filed Nov. 24, 1967 in the name of W. R. Beam entitled "Superconductive Tunneling Gate" and assigned to the same assignee of this application is also directed to the use of the Josephson tunneling effect for gate or switching devices.

However, even with the knowledge of the superconducting Josephson tunneling effect and its application to logic circuits and switching devices, it was not readily apparent how the Josephson tunneling effect could be applied to a high speed memory array utilized in random access memories using nondestructive readout. A need existed to take advantage of the very high speed operation of Josephson tunneling circuits for memory applications.

It is an object of this invention to provide an improved memory array and decoder therefor.

It is a further object of this invention to provide a Josephson tunneling memory array and Josephson tunneling decoder therefor.

It is a still further object of this invention to provide a very high speed memory array utilizing Josephson tunneling devices arranged and operated in a manner which permits nondestructive readout.

It is another object of this invention to provide a memory array wherein each of the storage cells of the array utilize a pair of Josephson tunneling devices which serve as gates thereby permitting writing of a "1" or "0" into the cell and the sensing or reading of the written state of the cell.

DESCRIPTION OF THE PREFERRED EMBODIMENTS

In accordance with the embodiments of this invention, a Josephson tunneling memory array is provided which comprises a plurality of memory cells each using a pair of Josephson tunneling devices as gates or switches. Writing is accomplished by the simultaneous energization of the word line containing the selected memory cell and a common bit line which controls switching of one of the Josephson tunneling gates of the memory cell if the memory cell is not already in the state that the writing operation is to produce. Depending on the state of the memory cell which is determined by the direction of the circulating currents in the cell and the application of current in one direction or the opposite direction to the common bit line, a "1" or "0" is written into the memory cell. For reading, a common sense line is energized simultaneously with the energization of the selected word line. The sense line reads or detects only a "1" state in the memory cell which is caused by the Josephson tunneling gate of the sense line, that is in cooperative relationship with the memory cell, to switch to its voltage state thereby providing a step voltage in the sense line. Josephson tunneling devices are used in the decoder of this invention which is compatible in speed and operation with the memory array.

The foregoing and other objects, features, and advantages of the invention will be apparent from the following more particular description of a preferred embodiments of the invention, as illustrated in the accompanying drawings.

BRIEF DESCRIPTION OF THE DRAWINGS

Referring to FIG. 1, three columns and two rows of Josephson tunneling memory cells are shown interconnected to provide a memory array of *m* columns and *n* rows.

Referring to FIGS. 1, 2, and 3 each memory cell 10 comprises a stem or input portion 12 which divides into two leg portions 14 and 16 before reuniting into the stem portion 12 for the next memory cell 10. A pair of Josephson tunneling gates 18 and 20 are associated with leg portions 14 and 16, respectively. These Josephson tunneling gates operate in the known superconductive tunneling manner as described in the prior art cited above. Insulation films 19 and 21 are located between superconductive metal electrodes 12A and 14A and between superconductive metal electrodes 12B and 16A thereby permitting superconductive tunneling current to flow through the junctions formed by the insulating films. The tunneling action takes place with or without a voltage drop across each junction depending on the amount of current flowing through the gate. In one state, the Josephson junction or gate has superconductive current flowing across the insulation layer which is accompanied by a voltage drop due to the fact that an external magnetic field supplied by current activated common bit line 22 influences the current threshold across the tunneling junction so that the existing current that flows in the loop including leg portions 14 and 16 exceeds the critical current of the Josephson tunneling junction. The second state of the Josephson tunneling junction or gate exists when superconductive current flow through the junction or across the insulator is not accompanied by a voltage drop across the junction. That is, a conventional Josephson tunneling gate is a superconductive element capable of supporting a Josephson current therethrough and having two voltage states dependent on the magnitude of the tunneling current through the gate. The theory of operation of the two states described above is that in the second state pairs of tunneling electrons flow through the barrier or insulation layer whereas in the first state only single electrons flow through the insulation or barrier region producing a voltage drop across the barrier. Each common bit line 22 for the memory cells in the same row is supplied with current in one direction or the opposite direction during the writing operation. The direction of current flow in the bit line 22 assists in writing a "1" or "0" into the cell 10. Each bit line 22 is superimposed directly over the portion of each memory cell 10 forming the row of cells that is defined by the two Josephson tunneling gates 18 and 20. Hence, the common bit line 22, upon energization with current, serves to induce a magnetic field in gates 18 and 20, respectively, defined by superconductive metal portions 12A, 14A and 12B, 16A (see FIG. 3).

Figure 1:
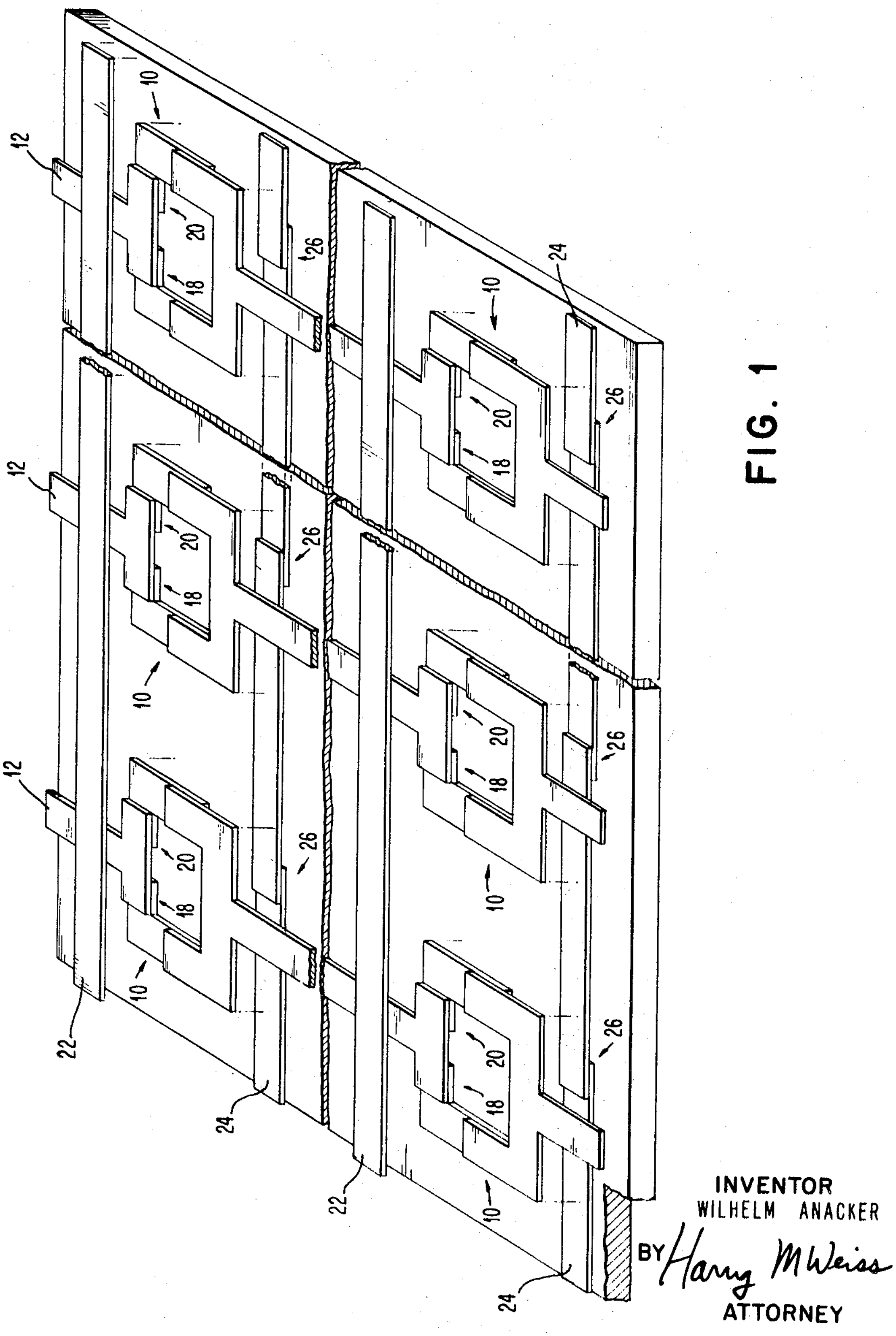
FIG. 1 is a perspective view of a Josephson tunneling memory array in accordance with this invention.

A sense line 24 common to each row of memory cells is strung across and below the memory cells 10 in the same row in the manner of the common bit line 22 that is strung across and above the memory cells located in the same row. However, each sense line 24 has a Josephson tunneling junction or gate 26 that is inductively associated with member 16B of the leg portion 16 of each memory cell. Hence, each common sense line 24 is superimposed below the portion of each memory cell 10 defined by members 14B and 16B. The sense line 24 is energized with current only during the read operation.

Write Operation

Figure 2:
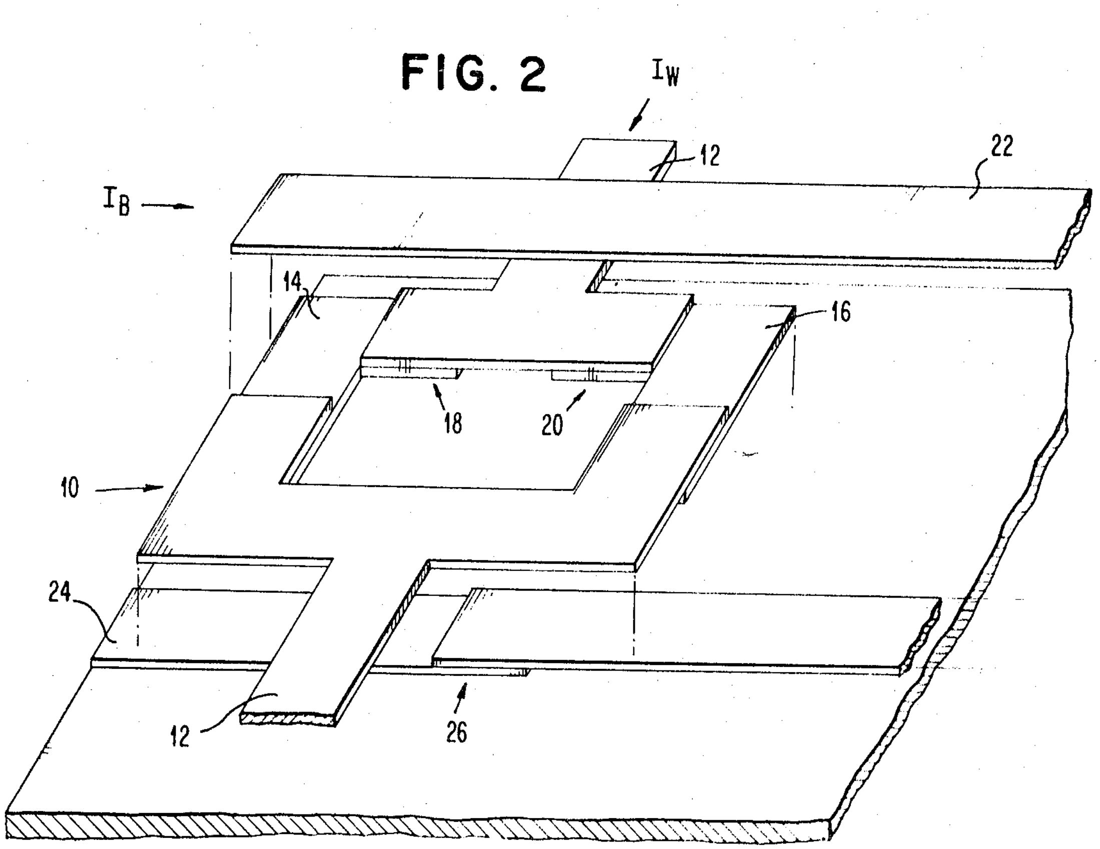
FIG. 2 is an enlarged view of one Josephson tunneling memory cell of the memory array of FIG. 1.
Figure 3:
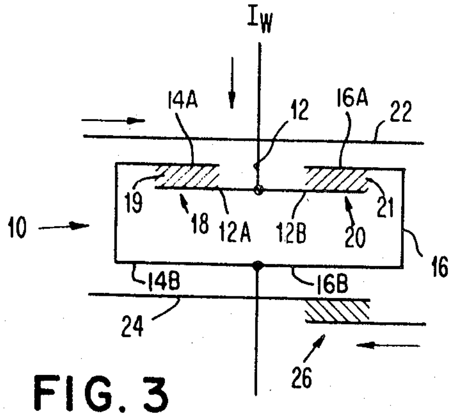
FIG. 3 is a diagrammatic view of the memory cell of FIG. 2 which illustrates in elevation, the arrangement and location of the Josephson tunneling gates of the memory cell in relation to the bit line and the sense line which is provided with a Josephson tunneling gate.
Figure 4A:
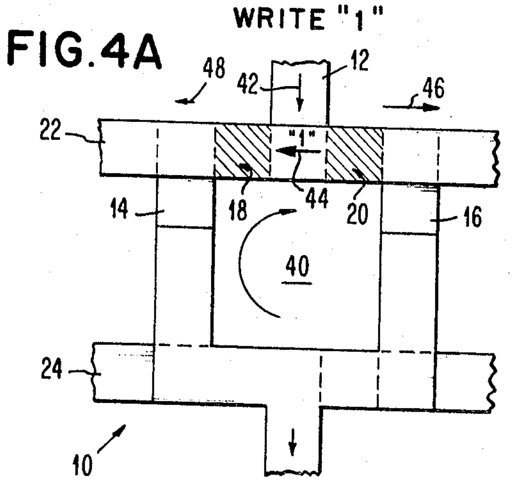
FIGS. 4A, 4B, 4C and 4D illustrate writing operations of a "1" or "0" for the memory cell of FIG. 2.
Figure 4B:
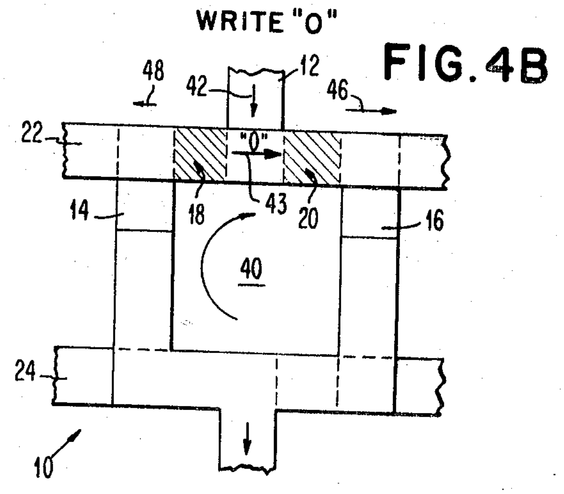

Reference to FIGS. 4A, 4B, 4C and 4D in conjunction with either FIGS. 1, 2, or 3 provides an understanding of the write operation for the memory cell 10 of this invention. Referring to FIGS. 4A and 4B, the clockwise direction of the arrow within box 40 is indicative of the direction of current flowing in the superconductive loop which includes legs 14 and 16 of each memory cell. In FIG. 4A, a "1" is being written into the memory cell which requires that simultaneous current pulses be applied to the line 12 and the common bit line 22. A positive current pulse in the direction shown by arrow 42 is applied to the line 12 of the selected column and a current pulse in the negative direction, as shown by arrow 44, is applied to the common bit line 22. Since the direction of current along the common bit line 22 is antiparallel or opposite in direction to the clockwise circulating current in the loop, the current in the gate 20, which is closest to the saturation or maximum point that would cause switching, because of both the clockwise direction of the current in the superconductive loop and the additional current from input portion 12, is antiparallel to the direction of current in the bit line 22, therefore, no switching occurs. Arrow 46 indicates that the current in gate 20 is greater than the current in gate 18 as shown by smaller arrow 48 which is opposite in direction to arrow 46. Accordingly, the magnetic field from the current in the bit line 22 does not influence the switching of gate 18 to its voltage state since the current in gate 18 is far from the saturation current needed to switch the gate due to the presence of opposite currents from the clockwise circulating currents in the superconductive loop and the current introduced from input portion 12. Hence, there is no switching performed at all in either gates 18 or 20 and the memory cell 10 maintains its clockwise circulating current state as illustrated in FIG. 4A.

Referring to FIG. 4B, writing a "O" into a memory cell 10 having a clockwise circulating current indicative of a "1" state as shown by the arrow in the box 40 of FIG. 4B, is accomplished by simultaneously applying positive current in the direction shown by arrow 42 to the input line 12 while energizing the common bit line 22 with current in the direction shown by arrow 43. The direction of the current in the bit line 22 is, as illustrated in FIG. 4B, from left to right which is opposite to the situation where a "1" is written into the cell as shown in FIG. 4A. Since the direction of current in the common bit line 22 is parallel or in the same direction as the almost maximum current in the gate 20, then this gate, because it now attains a maximum current above its superconductive current load, due to the influence of the magnetic field of the bit line 22, causes a switching operation to occur in the gate 20 to its voltage state thereby resulting in redistribution of the current in the box 40. Consequently, the clockwise circulating current condition shown within the box 40 is reversed into a counterclockwise circulating current condition. In its new counterclockwise circulating current condition, the memory cell 10 of FIG. 4B is in a "0" state.

Figure 4C:
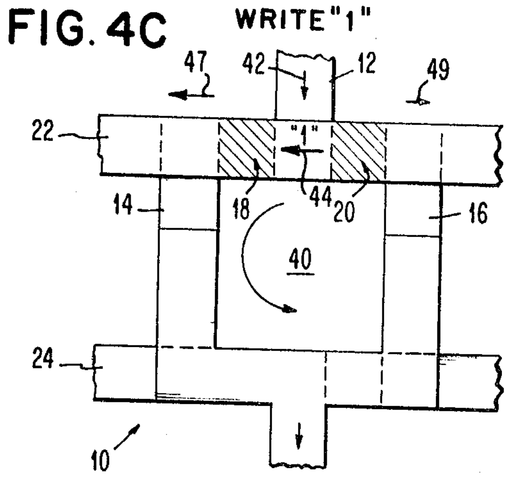

Referring to FIG. 4C, writing a "1" into a memory cell 10, which is in a "0" circulating current state, as indicated by the counterclockwise arrow in box 40, requires simultaneous application of current to the input portion 12 and to the common bit line 22 in the "1" direction indicated by arrow 44. This serves to write "1" into the cell 10 of FIG. 4C. The manner in which this is done is that the gate 18, which has a larger amount of current therethrough (as shown by large arrow 47) than the gate 20 (as shown by small arrow 49) due to the initial direction of the counterclockwise circulating current within the cell 10, becomes oversaturated due to the parallel direction of the current in the bit line 22, influencing the current in the gate 18. The gate 18 switches thereby causing a redistribution of the current within the memory cell 10 of FIG. 4C into a clockwise direction from the initial or previous counterclockwise direction. Upon reaching its redistributed clockwise circulating current direction, the memory cell 10 is now in a "1" state.

Figure 4D:
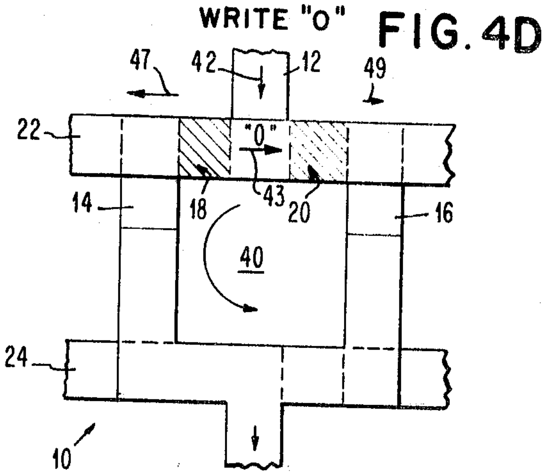

Referring to FIG. 4D, writing a "0" into the memory cell 10 which already is in its "0" state will not affect its natural "0" state. As in FIG. 4A, the application of concurrent or simultaneous current pulses to the input portion 12 and to the common bit line 22 in the "0" direction does not switch either of the two gates thereby permitting the counterclockwise current direction in the memory cell 10 to remain unchanged thereby keeping its "0" state.

Accordingly, writing a "1" into the memory cell 10 is illustrated by FIGS. 4A and 4C and writing a "0" is illustrated by FIGS. 4B and 4D. Only when the cell 10 is in the condition shown in FIGS. 4B and 4C does switching of a gate take place with the resultant redistribution of current in the cell 10 to the opposite direction.

READING OPERATION

Figure 5A:
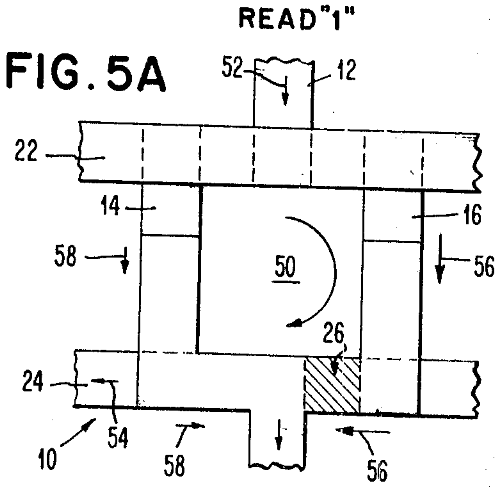
FIGS. 5A and 5B illustrate the reading operations for the memory cell of FIG. 2.

In FIG. 5A box 50 indicates that the memory cell has a current direction in the "1" state as illustrated by the clockwise arrow shown within the box 50. In carrying out a reading operation, simultaneous application of current to the input portion 12 of the memory cell 10 and to the common sense line 24 is required (as shown by current direction arrows 52 and 54, respectively). In the illustration of FIG. 5A, the current going through the leg portion 16 is much greater, as shown by large arrows 56, than the current going through the leg portion 14, as shown by small arrows 58, in order for the clockwise circulating current direction to exist in the cell 10 as shown by the clockwise arrow in box 50. Consequently, upon application of a current pulse, as indicated by arrow 54 going from right to left, through the sense line 24, the sense gate 26 switches to its voltage state since the current in the memory cell's leg portion 16 located above the sense gate 26 is in a clockwise direction and the current in the common sense line 24 is parallel or in the same direction therewith. Since the current through the sense gate 26 is just below the level needed to switch the gate to its voltage state, the influenced current in the gate 26 from the circulating clockwise current in the cell 10 causes an excess of current above the switching level to pass through the Josephson tunneling junction 26 which serves to switch the junction to its voltage state. This voltage switching operation is detected or read out at the end of the sense line 24 due to the formation of a voltage step in the sense line 24 because of the switching of the gate 26.

Figure 5B:
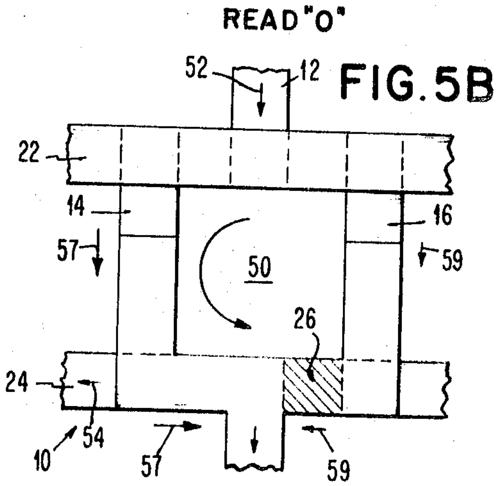

Referring to FIG. 5B, the memory cell 10 is in a "0" state since the circulating current within the cell as shown by the counterclockwise arrows in the box 50 is in a counterclockwise or "0" direction. As in FIG. 5A, a reading operation is carried out by simultaneously applying current pulses to both the input portion 12, in the direction shown by arrow 52, and the common sense line 24, in the direction shown by arrow 54. Accordingly, in carrying out a reading operation of the memory cell 10, the same simultaneous current pulsing operation is performed for memory cells in the "1" or "0" states of FIGS. 5A and 5B, respectively. Due to the counterclockwise circulating current in the cell 10 in FIG. 5B, current in the leg portion 14 is greater when the current is supplied to input portion 12, as shown by large arrow 57, than the current in the leg portion 16, as shown by small arrow 59. Therefore, in this situation, the current in leg portion 16 located above the sense gate 26 is very small in the direction shown by arrow 59 since it is the net amount of the difference between half of the current applied to input portion 12 subtracted by the circulating current in the counterclockwise direction that exists in the cell 10. Hence, this small current in leg portion 16 of FIG. 5B as contrasted with the large current in leg portion 16 of FIG. 5A, is insufficient to influence switching of the sense gate 26. Therefore, the absence of a voltage step in the sense line 24 indicates that the memory cell 10 is in a "0" state.

In both the writing and reading operations, a current pulse is supplied to the word line or input portion 12 of the selected memory cell in the chosen column of cells. This current pulse $I_W$ is always in the same positive direction for both reading and writing operations since the inductance $L_{14}$ of the leg portion 14 is equal to the inductance $L_{16}$ of the leg portion 16, the current $I_W$ entering input portion 12 of the memory cell 10 splits in half with $I_W/2$ going down the leg portion 14 and $I_W/2$ currents in each leg portion are superimposed upon the existing circulating current in the cell 10 which is either in a "1" (clockwise direction) state or in a "0" (counterclockwise direction) state. Therefore, depending on the "1" or "0" state of the memory cell, the current in leg portions 14 and 16 of the memory cell 10 are either small or large, but one leg portion of the memory cell always has a larger amount of current than the other leg portion.

Decoder

Figure 6:
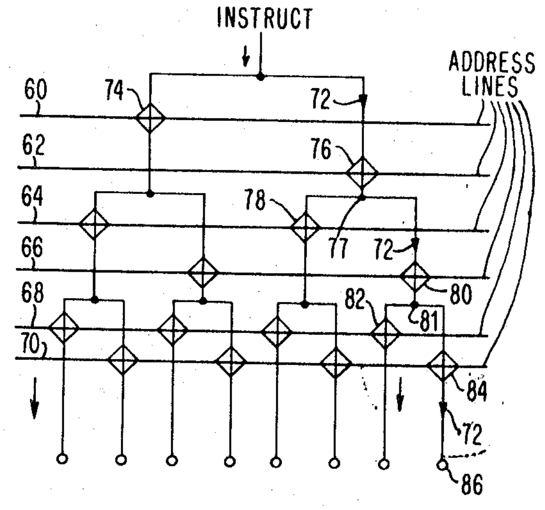
FIG. 6 schematically illustrates the decoder of this invention using Josephson tunneling gates.

Referring to FIG. 6, a decoder arrangement using Josephson tunneling gates or switches is shown. The decoder arrangement of FIG. 6 is particularly useful for one or more of the operations of directing current into one of the columns of the memory array using the input portion 12 of each memory cell in the column, directing current in one direction or the opposite direction for each common bit line 22 for a row of memory cells of the memory array, and/or directing current into a selected common sense line for a row of cells in the memory array. The decoder of FIG. 6 is a superconductive tunneling arrangement and hence, is compatible in speed and performance with the memory array of FIG. 1.

By applying an instruct signal to the input of the decoder tree arrangement of FIG. 6 and by proper addressing of address lines 60, 62, 64, 66, 68, and 70 operation of one selected branch of the decoder is achieved. For example, in order to direct instruction current to the branch of the decoder tree that is depicted by the arrow 72, which branch is at the far right of the decoder arrangement of FIG. 6, the pair of address lines 60 and 62 are used to select the desired branch of the decoder by means of applying current to the address lines 60 which switches gate 74 to its voltage state thereby permitting the instruct current to flow down the path of the decoder branch through gate 76 which was not switched since no current was applied to the address line 62. Accordingly, Josephson tunneling gate 74, which is at right angles or perpendicular to the address line 60 and operates in the same manner as one of the gates of the memory array of FIG. 1 is caused to switch to its voltage state. Accordingly, node 77 immediately following the gate 76 serves as the input to the two branches connected to the node 77. By applying current through the address line 64, gate 78 is placed into its voltage state thereby resulting in current passing into the branch which contains the arrow 72. As described above with respect to 76, gate 80 in its nonvoltage state since no current is applied to the address line 66 thereby permitting current to pass through this gate into the two branches of the decoder that are connected to nodes 81. By applying current through the address line 68, gate 82 is made to switch into its voltage state thereby permitting current to flow through gate 84 which is in its voltage state since no current is supplied to the address line 70. Accordingly, in this manner the instruction coming into the decoder tree arrangement of FIG. 6 is provided to the node 86 which is connected either to a common bit line 22, a common sense line 24, or a word line 12 associated with one of the columns of the memory array. Therefore, by proper selection and application of current to the address lines, any branch of the decoder of FIG. 6 is chosen.

Address, Decoder, and Memory Array System

Figure 7:
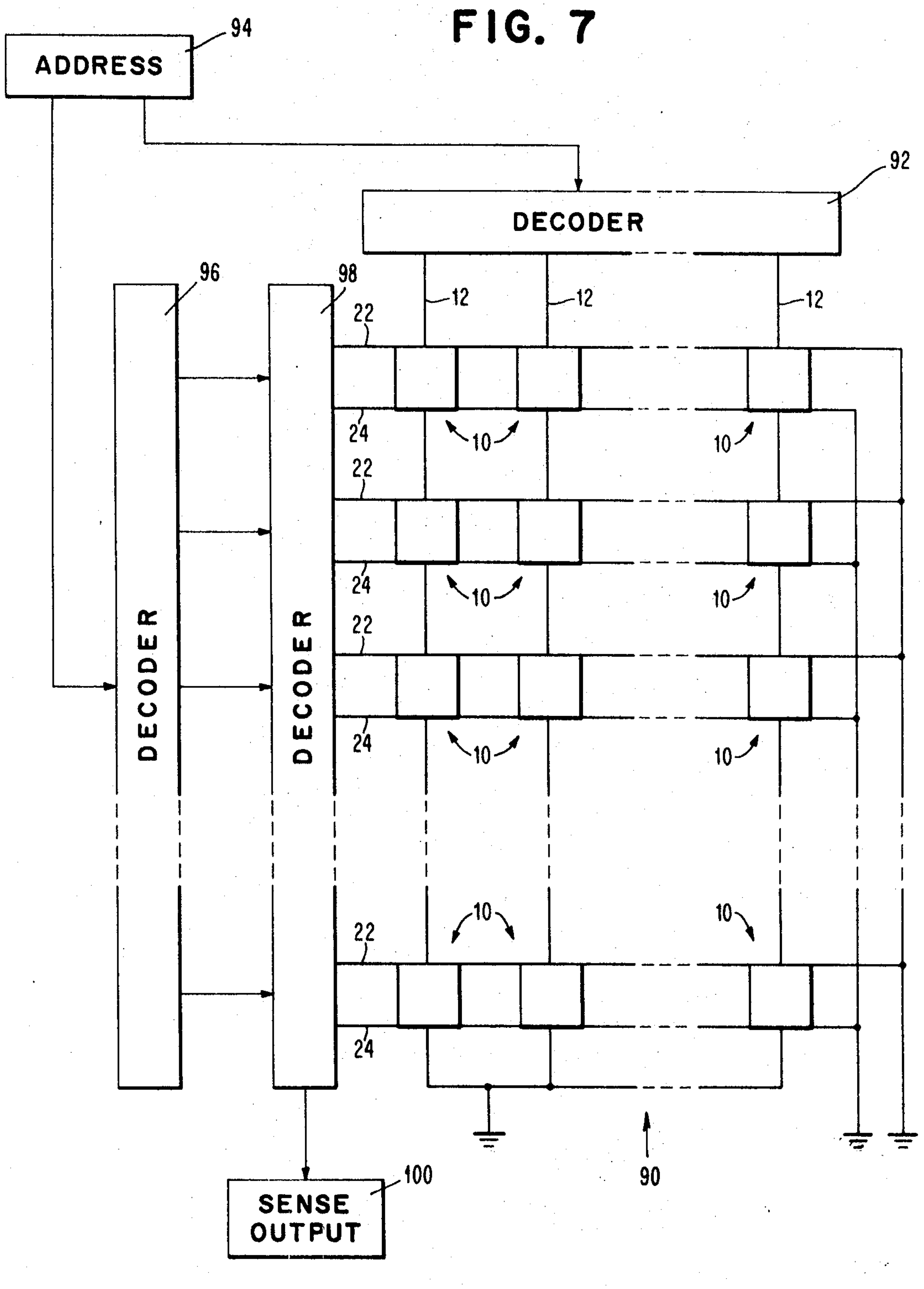
FIG. 7 schematically illustrates the memory array of FIG. 1 connected to decoders which are operated by an address thereby providing a high speed operating memory array.

Referring to FIG. 7, a system is shown using the address and decoder arrangement of FIG. 6 in conjunction with the memory array of FIG. 1. Reference numeral 90 generally designates the memory array. Decoder 92 is connected to the word lines 12 of the memory array 90. Address 94 is associated with the decoder 92 as illustrated in FIG. 6 which depicts the selection of the chosen branch of the decoder by means of the address lines being in cooperative association therewith. The address 94 is similarly associated with decoder 96 as with decoder 92. Decoder 98 serves to accept inputs from the decoder 96 to operate the common bit lines 22 and the common sense lines 24 that are connected to the decoder 98. Accordingly, the decoder 98 is used to pass currents in the bit lines 22 in the directions shown in FIGS. 4A, 4B, 4C, and 4D for a writing operation and also passes currents in the sense lines 24 in the direction shown in FIGS. 5A and 5B for a reading operation. The voltage step that occurs when the sense gate 26 of a sense line 24 switches to its voltage state is detected and identified by sense output 100 which is connected to the decoder 98 and is any switchable voltage step indicating device or apparatus. All the word lines are connected together to ground, all the bit lines are connected together to ground, and all the sense lines are connected together to ground.

Method of Fabrication

In order to fabricate the memory array of FIG. 1 or the decoder or address of FIG. 6, a superconductive ground plane is formed, such as by evaporation processes, onto an insulating substrate. If desired, the insulating substrate can be eliminated and the superconductive ground plane serves as the bottom support. The superconductive ground plane can be made of one of the superconductive materials such as either lead, tin, niobium, or tantalum or alloys thereof. Subsequent to the deposition of the superconductive ground plane, a deposition step is carried out for depositing a continuous insulating layer of about 5,000 A. This deposition step can also be carried out by evaporation techniques or, if desired, by RF sputtering techniques. Following the deposition of the insulating layer which is continuous and pinhole free, a superconductive pattern is deposited through a mask onto the insulating layer to provide the bottom portion of the sense lines 24, the bottom portions of the leg portions 14 and 16 of the memory cell 10, and the bottom portions of the decoder lines. After the formation of these superconductive lines, a controlled oxidation or insulation deposition step having a thickness of about 40 A, or less is carried out. This is needed for the formation of all junction barriers for the tunneling gates 26 of the sense lines 24, the gates 18 and 20 of the memory cells 10, and the gates for the decoders. Subsequent to this a further deposition of superconductive material is carried out through a mask to complete the sense lines 24, the memory cells 10, and the decoders. Subsequent deposition of insulating and superconducting metal layers are used to complete the bit lines 22 and the address lines. In order to operate the entire superconductive system including memory array, address and decoder units, the entire system must be operated at a temperature in the range of from about 1 to 6° K. In the situation where lead or niobium or alloys thereof are used for the superconducting material a temperature of about 3.6° K., is needed. When tin is used as the superconducting material, a temperature of about 1.7° K., is needed.

Memory Cell Dimensions And Characteristics

The dimensions of the storage cells, decoders and address units or means is, in one embodiment, selected so that a memory module of 256×256 bits is placed on about a 6×6 inches substrate with a minimum line width of about 4 mils. The thickness of the superconducting films are preferably about 5,000 A. The thickness can be varied as desired. A memory array of this bit density utilizes a storage cell of about 20×16 mils which would allow a 4 mil spacing between adjacent cells thereby resulting in center to center spacing of 24×20 mils. A narrow strip of about 6×0.3 inches contains the decoder of FIG. 6. Hence, a total bit density of about 1,800 bits per square inch is provided by this array. By minimizing the size of the storage cell and the other dimensions mentioned above the bit density can be increased by at least a factor of 4 over the amount described above.

With regard to the switching speed of the storage cell, speed less than 800 picoseconds is achievable. As an illustrative embodiment, a word current supplied to lines 12 of the memory cell is about 40 milliamps, the bit and sense currents are about 27 milliamps, the instruct current for the decoder is about 140 milliamps, and the adder currents are about 15 milliamps. The Josephson gate characteristics are a maximum gate current of 50 milliamps for switching to its voltage state, and a minimum gate current of 10 milliamps before switching back to the no voltage state.

A 40 nanosecond read cycle and write cycle time and a 30 nanosecond read access time is achievable with this array. The sense readout signal is about 6 millivolt or alternatively, a 20 milliamp sense current is provided.

SUMMARY

A memory cell using Josephson tunneling gate devices or means is described which provides in combination with a plurality of identical cells a memory array. Means are provided for writing into each cell by effecting switching of the Josephson tunneling gates depending on the amount of current in the gate. Reading or sensing means associated with the memory cell, which is a superconductive member shaped as a loop, provide an indication of the "1" or "0" storage state of each memory cell after a writing operation. By using address and decoder means associated with the memory cells of the memory array, information is written into and/or read out of the memory array thereby providing a high speed information storage system. Additionally, a method for fabricating a high speed information system is described which permits the formation of the memory array, address and decoders as an integral unit.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A high speed information storage system comprising, in combination, a memory array having a plurality of memory cells, said memory cells of said memory array having Josephson tunneling gates; and address and decoder means associated with the memory cells of said memory array for at least one of reading information from and writing information into said array.

2. A high speed information storage system in accordance with claim 1, wherein said memory array, said address means, and said decoder means being superconducting in operation, said address and decoder means writing information into and reading information from said memory array.

3. A high speed information storage system in accordance with claim 1, wherein said decoder means comprising a plurality of superconductive lines each of which is provided with a Josephson tunneling gate, said address means switching selected gates of said superconductive lines of said decoder means.

4. A high speed information storage system in accordance with claim 1, wherein each of said plurality of memory cells comprising an input portion, one of said Josephson tunneling gates being provided in each of a pair of branches connected to said input portion, a bit line spaced from and magnetically associated with the two Josephson tunneling gates of said pair of branches for effecting switching of either one of said gates to a voltage state depending upon the amount of current in the gates, a sense line spaced from one of said branches and having a Josephson tunneling gate magnetically associated with said one branch and switchable to a voltage state depending upon the amount of current in the sense line Josephson tunneling gate, said address and decoder means cooperatively associated with said input portion of each of said cells and with said bit lines associated with each of said cells for writing information into each of said cells, said address and decoder means cooperatively associated with said input portion of each of said cells and with said sense lines associated with each of said cells for reading information from each of said cells.

5. A high speed information storage system in accordance with claim 1, wherein said memory array, said address means, and said decoder means being superconducting in operation, said decoder means comprising a plurality of superconductive lines each of which is provided with a Josephson tunneling gate, said address means switching selected gates of said superconductive lines of said decoder means, each of said plurality of memory cells comprising an input portion, one of said Josephson tunneling gates being provided in each of a pair of branches connected to said input portion, a bit line spaced from and magnetically associated with the two Josephson tunneling gates of said pair of branches for effecting switching of either one of said gates to a voltage state depending upon the amount of current in the gates, a sense line spaced from one of said branches and having a Josephson tunneling gate magnetically associated with said one branch and switchable to a voltage state depending upon the amount of current in the sense line Josephson tunneling gate, said address and decoder means cooperatively associated with said input portion of each of said cells and with said bit lines associated with each of said cells for writing information into each of said cells, said address and decoder means cooperatively associated with said input portion of each of said cells and with said sense lines associated with each of said cells for reading information from each of said cells.

6. A high speed information storage system in accordance with claim 1, wherein each of said plurality of memory cells comprising, in combination, an input portion, said Josephson tunneling gates means connected to said input portion for effecting switching of the memory cell to either a "1" or a "0" state, and means associated with said Josephson tunneling gates means for effecting switching of said Josephson tunneling gates means depending on the amount of current in said gates means.

7. A high speed superconducting memory cell comprising, in combination:

an input portion;

Josephson tunneling gate means connected to said input portion for effecting switching of the memory cell to either a "1" or a "0" state;

means associated with said Josephson tunneling gate means for effecting switching of said Josephson tunneling gate means depending upon the amount of current in said gate means, wherein said Josephson tunneling gate means comprises a pair of Josephson tunneling gates connected to said input portion, said switching means associated with said Josephson tunneling gate means being adapted to switch either one of said pair of Josephson tunneling gates to a voltage state dependent upon the amount of current in each gate.

8. A high speed superconducting memory cell comprising, in combination, a current storage superconductive loop provided with Josephson tunneling gate means adapted to switch current in said loop to either a clockwise or counterclockwise direction representative of "1" or "0" storage states, and writing means associated with said Josephson tunneling gate means for effecting switching of said Josephson tunneling gate means depending on the amount of current in said gate means.

9. A high speed superconducting memory cell in accordance with claim 8, including reading means associated with said superconductive loop to sense the "1" and "0" storage states of said memory cell.

10. A high speed superconducting memory cell comprising, in combination, a superconductive current storage member provided with Josephson tunneling gate means adapted to switch current in said member in one direction representative of a "1" storage state and another direction representative of a "0" storage state, writing means associated with said Josephson tunneling gate means for effecting switching of said Josephson tunneling gate means depending on the amount of current in said gate means, and reading means associated with said superconductive member to sense and distinguish between the "1" and "0" storage states of said memory cell without destroying the information written into said memory cell.

11. A high speed superconducting memory cell comprising, in combination, an input portion, a Josephson tunneling gate provided in each of a pair of branches connected to said input portion, a bit line spaced from and magnetically associated with the two Josephson tunneling gates of said pair of branches for effecting switching of either one of said gates by a voltage state depending upon the amount of current in the gates and a sense line spaced from one of said branches and having a Josephson tunneling gate magnetically associated with said one branch and switchable to voltage state depending upon the amount of current in the sense line Josephson tunneling gate.

12. A high speed superconducting memory cell comprising, in combination, a superconductive current storage member provided with Josephson tunneling gate means adapted to switch current in said member in one direction representative of a "1" storage state and in another direction representative of a "0" storage state, and reading means associated with said superconductive member to sense and distinguish between the "1" and "0" storage states of said memory cell without destroying the information written into said memory cell.

13. A high speed superconducting memory cell in accordance with claim 12, wherein said reading means comprising a sense line having a Josephson tunneling gate magnetically associated with said superconductive member and switchable to a voltage state when the memory cell is in one of the two storage states.

14. A high speed superconducting memory array comprising a number of interconnected memory cells arranged in N number of columns and M number of rows where N and M are any positive integer, each of said memory cells comprising a superconductive current storage member provided with Josephson tunneling gate means adapted to switch current in said member in one direction representative of a "1" storage state and in another direction representative of a "0" storage state, and reading means associated with said superconductive member to sense and distinguish between the "1" and "0" storage states of said memory cell without destroying the information written into said memory cell.

* * * * *